United States Patent [19]

Wang

[11] Patent Number: 4,529,574
[45] Date of Patent: Jul. 16, 1985

[54] PROCESS FOR THE REMOVAL OF SULFUR OXIDE FROM A GAS

[75] Inventor: Li Wang, Westmont, Ill.

[73] Assignee: UOP Inc., Des Plaines, Ill.

[21] Appl. No.: 575,638

[22] Filed: Jan. 30, 1984

[51] Int. Cl.³ .............................................. B01J 8/00
[52] U.S. Cl. .................................. 423/244; 252/192; 208/120
[58] Field of Search .......... 423/242 A, 242 R, 244 A, 423/244 R; 55/73; 252/192

[56] References Cited

U.S. PATENT DOCUMENTS

| | | | |
|---|---|---|---|
| 3,492,083 | 1/1970 | Lowicki et al. | 423/244 |
| 3,704,095 | 11/1972 | Nicklin | 423/244 |
| 3,917,799 | 11/1975 | Torrence et al. | 423/244 |
| 4,071,436 | 1/1978 | Blanton, Jr. et al. | 208/120 |
| 4,153,534 | 5/1979 | Vasalos | 208/120 |
| 4,153,535 | 5/1979 | Vasalos et al. | 208/120 |
| 4,204,945 | 5/1980 | Flanders et al. | 208/120 |
| 4,243,556 | 1/1981 | Blanton, Jr. | 252/455 Z |
| 4,252,635 | 2/1981 | Blanton, Jr. | 208/114 |
| 4,300,997 | 11/1981 | Meguerian et al. | 208/120 |
| 4,428,827 | 1/1984 | Hobbs et al. | 423/244 |

*Primary Examiner*—Gregory A. Heller
*Attorney, Agent, or Firm*—Thomas K. McBride; William H. Page, II; Louis A. Morris

[57] ABSTRACT

A process for removing sulfur oxides from a gas by contacting the gas with an acceptor comprising a lithium doped mixture of magnesium and aluminum oxides. The acceptor reacts with and retains the sulfur oxides. The retained sulfur oxides are then removed from the acceptor by reducing the acceptor through contact with hydrogen. The above process has the advantage of extremely high selectivity for hydrogen sulfide with regard to the effluent produced during the reduction step.

6 Claims, No Drawings

4,529,574

PROCESS FOR THE REMOVAL OF SULFUR OXIDE FROM A GAS

BACKGROUND OF THE INVENTION

1. Field of the Invention

The field of art to which the claimed invention pertains is the removal of sulfur oxide from a gas, particularly a flue gas.

2. Background Information

Due to the ever increasing concern about air pollution, great efforts have been expended in recent years toward the development of processes to reduce the pollutants introduced into the atmosphere from various industrial operations. One of the most onerous of these pollutants is sulfur dioxide which is present in the stacks of flue gases from various operations. In one such operation, the fluidized catalytic cracking (FCC) process, sulfur compounds contained in the hydrocarbon feedstock result in sulfur containing material to be deposited on the FCC catalyst along with the carbonaceous material and thereby cause the generation of sulfur dioxide in the FCC regeneration section when the sulfur is burned off the catalyst along with the carbon deposits. This sulfur dioxide becomes a part of the regenerator flue gas and thus a pollutant when the flue gas eventually finds its way into the atmosphere.

There are many methods known to the art for removal of sulfur dioxide from stack or flue gases. There is, for example, the wet scrubbing process in which the sulfur dioxide reacts with an appropriate reactant contained in an aqueous solution or slurry sprayed into the flue gas, the sulfur thereby being removed from the system as a compound contained in the liquid phase. In another process the flue gas is passed through a fixed solid bed containing a sulfur "acceptor" with which the sulfur dioxide reacts and on which the sulfur is retained in the sulfate form, thereby being removed from the flue gas.

The basic prior art process for removal of sulfur dioxide from flue gas highly pertinent to the present invention is that disclosed in U.S. Pat. No. 4,071,436 to Blanton, Jr., et al. This reference discloses alumina and/or magnesia particles used to react with sulfur dioxide in an FCC regenerator flue gas to form a solid compound. When reacted with hydrocarbons in a reducing environment, such as the reactor, the sulfur is released from the acceptor. Hydrogen-containing gas is stated to be a less preferred reducing medium. This reference further states that it is preferred that materials such as lithium not be present in the particulate solid used for removal of the sulfur dioxide, since they simply form a nonregenerable sulfur-containing solid.

Other references having similar teachings as Blanton, Jr., et al. but not as relevant or no more relevant to the present invention are U.S. Pat. Nos. 4,153,535 to Vasalos et al.; 4,153,534 to Vasalos; 4,204,945 to Flanders et al.; 4,243,556 to Blanton, Jr.; 4,252,635 to Blanton, Jr.; 4,300,997 to Meguerian et al. and 4,325,811 to Sorrentino. The last mentioned reference also teaches the use of a reducing zone, separate from the reactor and regenerator, in which the sulfur laden acceptor is relieved of sulfur by reduction with hydrogen or a hydrocarbon gas.

The present invention is based on the discovery of an acceptor of a particular composition which has unique capabilities with regard to the disposition of sulfur oxides in a flue gas.

SUMMARY OF THE INVENTION

It is the primary objective of the present invention to provide a process not only capable of removing sulfur oxide from a gas by means of an acceptor, but which also maximizes the proportion of the sulfur subsequently removed from the acceptor by reduction with hydrogen in the form of hydrogen sulfide.

Accordingly, in its broadest embodiment, the present invention comprises a process for removing sulfur oxides from a gas which comprises: (a) contacting the gas with an acceptor at acceptance conditions which reacts with and retains the sulfur oxides, the acceptor comprising a lithium doped mixture of magnesium and aluminum oxides; and (b) removing the retained sulfur oxides from the acceptor by contacting the acceptor with hydrogen at reduction conditions.

Other embodiments of the invention encompass details abut acceptor composition, flow schemes and reaction conditions, all of which are hereinafter disclosed in the following discussion of each of the facets of the invention.

DESCRIPTION OF THE INVENTION

I have made the surprising and unexpected discovery that a lithium doped mixture of magnesium and aluminum oxides is not only an excellent acceptor, as far as removing sulfur oxide from a gas is concerned, but is also readily regenerable, i.e., the sulfur oxide is easily removed by reduction with hydrogen. This is in contradistinction to the express teaching of aforementioned U.S. Pat. No. 4,071,436 (column 13) that lithium, among other materials, not be present in a particulate solid used for removing sulfur compounds from gases, since it simply forms a nonregenerable sulfur-containing solid. I have also made the equally surprising and just as important discovery that when reduced with hydrogen the sulfur-containing acceptor of the process of my invention produces almost exclusively hydrogen sulfide gas as opposed to the much less desirable free sulfur or sulfur dioxide as produced by the acceptors of known processes.

It is important to avoid the production of free sulfur or sulfur dioxide in the course of reducing or regenerating acceptors. Free sulfur would have the tendency to plug the process equipment and the production of sulfur dioxide would, of course, defeat the purpose of the sulfur oxide removal from the gas. The high purity hydrogen sulfide obtained by the process of the present invention may be disposed of in many ways, including direct sale as a valuable industrial chemical.

The term "lithium doped" as used herein may be given a very broad construction, since it is not important exactly in what manner the lithium is incorporated with the mixture of magnesium and aluminum oxides. Thus, lithium doping may be accomplished, e.g., by adding a lithium salt to an aqueous sol of magnesium and aluminum salts prior to forming the sol into a gel for extrusion or sphere formation, or magnesia and alumina mixture extrudates or spheres may be impregnated with an aqueous solution of a lithium salt, dried and calcined. The amount of lithium added by whatever method of preparation is used should preferably result from about 0.5 wt. % to about 1.0 wt. % on the basis of the free metal. The weight ratio of magnesium oxide to aluminum oxide in the acceptor is preferably from about 0.15:1.0 to about 0.25:1.0.

The process of the present invention is best employed in a dry particle scrubber. More particularly, the acceptor is preferably in the form of spheres or extrudates packed in a fixed bed contained in a contacting zone or scrubbing chamber, although a fluidized bed of small particles of acceptor would probably also be effective. The bed of acceptor may be divided into two or more portions, with each portion being in an isolated contacting zone. Each such isolated zone may then be cycled between the acceptance step of the invention where the sulfur oxides combined with the acceptor and the removal step of the invention where the sulfur oxides are removed from the acceptor by contact with hydrogen at reduction conditions. Such cycling may be accomplished by a system of valves and automatic controllers, the details of which would be familiar to those skilled in the art. The acceptance step conditions may include a temperature from about 540° C. to about 760° C., while the removal or reduction step conditions would ideally include a temperature in excess of about 730° C.

The process of the present invention would be particularly useful for treating the flue gas from a fluid catalytic cracking unit (FCC) regenerator. It is not unusual for such flue gas to be high in sulfur oxide content due to the high sulfur content frequently found in low quality, high sulfur FCC feedstocks, the use of which is becoming increasingly common. Associating the process of the present invention with the FCC process would have the further advantage that a source of reducing hydrogen would be readily available since hydrogen is one of the FCC reaction products and could be supplied from the standard FCC gas concentration or treatment facilities in a quantity and purity quite adequate for use in the process of the present invention. Unlike some of the aforementioned background processes the acceptor used by the present invention could not be mixed and circulated with the FCC catalyst because the lithium compounds would tend to migrate from the acceptor to the catalyst which would be deleterious to the performance of both.

The following nonlimiting examples are presented to illustrate the remarkable capability of the process of the present invention to not only achieve complete acceptance of $SO_2$ from a gas, but also to release the retained sulfur in the course of reduction with hydrogen in the desirable form of $H_2S$.

EXAMPLE I

Various samples of aluminum and magnesium oxide mixtures were obtained, two doped with sodium and two doped with lithium. The latter two samples were prepared for use in the process of the present invention by adding lithium nitrate to a solution of aluminum and magnesium nitrates, gelling the solution by adding sufficient ammonium hydroxide to it to raise the pH to 8.5, filtering out the aluminum/magnesium co-gel, drying the gel at 150° C. for 3 hours and calcining the gel at 595° C. for 6 hours. This preparation was used for obtaining the small quantities of sample needed for the laboratory analysis. Commercial quantities of acceptor would be obtained by spray drying or oil dropping and aging the co-gel by methods known to the art.

Following is a summary of the compositions of the above acceptors and performance (averaged over five cycles), when used to remove sulfur dioxide from a typical flue gas at 730° C. followed by reduction with hydrogen at 730° C.

| Acceptor Designation | Composition | | | | % Acceptance | Reduction | | |
|---|---|---|---|---|---|---|---|---|
| | % Na | % Li | % Mg | % Al | | % $H_2S$ | % $SO_2$ | % $S_x$ |
| A | 2.1 | — | 19.8 | 33.8 | 100 | 76.3 | 1.0 | 22.7 |
| B | 1.2 | — | 17.3 | 33.2 | 100 | 80.0 | 0 | 20.0 |
| C | — | 0.69 | 19.2 | 33.8 | 100 | 96.4 | 0 | 4.6 |
| D | — | 0.56 | 17.9 | 34.6 | 100 | 96.8 | 0 | 3.2 |

The remarkable effect of the process of the present invention is clearly apparent from the above data. The difference in the percent hydrogen sulfide produced during reduction between the sodium doped and lithium doped acceptor is testimony to the advantageous use of the present invention.

Data for the performance of above samples A and C over five cycles are as follows:

| Acceptors | % $H_2S$ | | | | |
|---|---|---|---|---|---|
| | Cycle-1 | -2 | -3 | -4 | -5 |
| A | 95.8 | 82.8 | 70.9 | 65.3 | 66.2 |
| C | 90.7 | 95.2 | 99.8 | 96.5 | 99.8 |

The last above data demonstrates that the advantageous effect of the present invention remains high and even improves over subsequent cycles in contradistinction to the process using the sodium doped acceptor. The high $H_2S$ selectivity observed for cycle-1 of acceptor A was due to the low recovery of free sulfur from the acceptor during the reduction step of that cycle. The sulfur recovery in the first cycle is always low for sodium doped acceptors. Presumably part of the sodium retains sulfur tenaciously with such acceptors.

EXAMPLE II

For the purpose of further comparison of the process of the present invention and a process known to the art, the same above test procedure was applied to an $Al_2O_3$ acceptor as disclosed in Blanton, Jr., et al. The results obtained are as follows:

| Composition | % Acceptance | Reduction | | |
|---|---|---|---|---|
| | | % $H_2S$ | % $SO_2$ | % $S_x$ |
| $Al_2O_3$ | 59.3 | 40.5 | 33.4 | 26.1 |

The low $H_2S$ selectivity and even low degree of acceptance of the Blanton, Jr., et al. acceptor is further evidence of the advantageous effect of the present invention.

EXAMPLE III

Thermogravimetric analysis was conducted on $Al_2O_3$ and the $Li.MgO.Al_2O_3$ of the present invention to determine the maximum $SO_2$ uptake capacity of each, as one would prefer an acceptor with not only a high $SO_2$ acceptance efficiency (acceptance rate) but also a high capacity (total $SO_2$ adsorbed for saturation of the acceptor). The latter is of importance particularly in the present process, because a high capacity means a longer duration before the acceptor needs to be regenerated which also means the frequency of cycling between acceptance and reduction will be minimal.

The following results were obtained:

| | Net weight increase from SO$_2$ at 730° C. (% of the initial sample weight) |
|---|---|
| Li.MgO.Al$_2$O$_3$ | 50% |
| Al$_2$O$_3$ | 3% |

The superiority of the acceptor of the present invention with regard to SO$_2$ uptake capacity is thus also demonstrated.

I claim as my invention:

1. A process for removing sulfur oxides from a gas which comprises:

(a) contacting said gas with an acceptor at conditions to react with the acceptor and retain said sulfur oxides therein, said acceptor comprising a lithium doped mixture of magnesium and aluminum oxides containing from about 0.5 wt.% to about 1.0 wt.% of lithium and in which the weight ratio of magnesium oxide to aluminum oxide is from about 0.15:1.0 to about 0.25:1.0; and (b) removing said retained sulfur oxides from the acceptor by contacting the acceptor with hydrogen at reduction conditions.

2. The process of claim 1 wherein said acceptance conditions comprise a temperature from about 540° C. to about 760° C.

3. The process of claim 1 wherein said reduction conditions comprise a temperature in excess of about 730° C.

4. The process of claim 1 wherein said gas comprises the flue gas from a fluid catalytic cracking unit regenerator.

5. The process of claim 1 wherein said acceptor is in the form of spheres or extrudates packed in a fixed bed.

6. The process of claim 5 wherein said fixed bed is divided into at least two portions, each portion being in an isolated contacting zone, the use of each zone cycling between the acceptance of sulfur oxides of step (a) and the removal of sulfur oxides of step (b).

* * * * *